United States Patent [19]

Inverarity et al.

[11] 4,234,698
[45] Nov. 18, 1980

[54] METHOD OF MAKING CURED AMINOPLAST FOAM

[75] Inventors: George Inverarity, West Midlands; Dennis H. Ogden, Wolverhampton, both of England

[73] Assignee: British Industrial Plastics Limited, England

[21] Appl. No.: 966,242

[22] Filed: Dec. 4, 1978

[30] Foreign Application Priority Data

Sep. 12, 1977 [GB] United Kingdom ............... 51269/77

[51] Int. Cl.² ...................... C08G 12/12; C08G 12/14
[52] U.S. Cl. ..................................... 521/188; 521/187
[58] Field of Search ................................ 521/187, 188

[56] References Cited

U.S. PATENT DOCUMENTS

| | | | |
|---|---|---|---|
| 2,789,095 | 4/1957 | Lindvig | 521/188 |
| 2,807,595 | 9/1957 | Brown | 521/106 |
| 3,975,318 | 8/1976 | Larsen et al. | 521/188 |
| 3,975,319 | 8/1976 | Larsen et al. | 521/188 |
| 4,026,980 | 5/1977 | Hubbard | 521/188 |
| 4,035,456 | 7/1977 | Hubbard et al. | 521/183 |
| 4,069,175 | 1/1978 | Moore | 521/187 |

FOREIGN PATENT DOCUMENTS

586199  3/1947  United Kingdom ..................... 521/188

*Primary Examiner*—Howard E. Schain
*Attorney, Agent, or Firm*—William A. Drucker

[57] ABSTRACT

A method of making a cured foamed amino formaldehyde product utilizes an amino formaldehyde precondensate of water content below 20% by weight in order to obtain a less brittle product. A liquid foamable composition is made by dispersing a curing catalyst and a blowing agent in the precondensate and the composition is heated to cause the blowing agent to form a foam and the precondensate to cure.

5 Claims, No Drawings

METHOD OF MAKING CURED AMINOPLAST FOAM

This invention relates to the production of cured amino-formaldehyde resins in the form of foam.

Cured foamed amino-formaldehyde resins as made from the uncured amino-formaldehyde resins ('precondensates') ordinarily used are for many purposes (e.g., for use as packaging) too brittle.

The present invention is based on our discovery that this brittleness arises from the presence of too high a proportion of water in the precondensate employed, and that brittleness can be very much reduced by keeping the water content below 20% by weight.

According to the invention, a method of making a cured foamed amino-formaldehyde product comprises:

(a) preparing a liquid foamable composition by dispersing a curing catalyst and a blowing agent in an amino-formaldehyde precondensate having a water content less than 20% by weight, and (b) heating the composition to cause the blowing agent to form a foam and the amino-formaldehyde precondensate to sure.

Preferably, to improve the stability of the liquid foamable composition in the interval between its preparation and use, the amino-formaldehyde precondensate is brought to a pH in the range 7–8.5 before the curing catalyst is dispersed in it.

The blowing agent may be a solid (for example azobisdi-carbonamide) which generates a gas on being heated. Preferably, however, it is a liquid of boiling point below 100° C. immiscible with water, or a liquid immiscible with water and forming therewith an azeotropic mixture of boiling point below 100° C. n-Heptane, which has a boiling point of 95° C. and forms with water an azeotropic mixture of boiling point 80° C., is particularly suitable as blowing agent. The blowing agent is used in a proportion such as to provide a foamed product of the desired density.

When the blowing agent employed is a water-immiscible liquid, then the curing catalyst employed is preferably one which is also effective to disperse the liquid blowing agent in the amino-formaldehyde precondensate. Suitable curing catalysts are surface-active agents containing a strongly acidic grouping such as the —$SO_3H$ group, for example the long chain alkyl benzenesulphonic acids such as dodecylbenzenesulphonic acid.

At the temperature at which foaming is to begin, the viscosity of the foamable composition is preferably not more than 1,000 poise; and a viscosity in the range 100–200 poise is particularly preferred.

If desired, a filler may be included in the foamable composition, and may in fact be used as a vehicle by which a liquid blowing agent is introduced into the amino-formaldehyde precondensate, the blowing agent (optionally with the curing catalyst dispersed in it) being absorbed in the filler before the latter is included in the composition.

Particularly suitable amino-formaldehyde precondensates for use in carrying out the invention can be prepared as described in the earlier paragraphs of Examples 1 to 4 later in this specification. Preferably the amino-formaldehyde precondensate employed is one based on urea and formaldehyde (used in the form of paraformaldehyde or hexamethylene tetramine or both). In reacting these substances, there is used a reaction modifier to maintain the reaction mixture in the liquid phase, suitably one or more of ethylene urea, a melamine-formaldehyde precondensate, melamine, diethylene glycol, polyvinyl alcohol, a water-soluble carbohydrate such as sucrose, and dicyandiamides. Ethylene urea and melamine-formaldehyde precondensates are particularly preferred reaction modifiers.

The invention is further illustrated by the following Examples, which relate to the preparation of cured foamed products that are more resilient and less brittle than cured foamed products made from conventional amino-formaldehyde precondensates of higher water content.

EXAMPLE 1

An amino-formaldehyde resin precondensate was prepared from the ingredients A given below in Table I by the following procedure. The paraformaldehyde, urea, ethylene urea and hexamethylene tetramine ('hexamine') were heated together at 60° C., and to the resin thus formed there was added a melamine formaldehyde resin (British Industrial Plastics Ltd. BL35 resin, having a molar ratio melamine:formaldehyde of 1:1.5) followed by ammonium sulphamate (to provide acid conditions, under which condensation rather than addition occurs). The temperature was maintained at 60° C. When the desired degree of condensation (corresponding to the attainment of a viscosity of 800 poise measured at 25° C.) was achieved, the pH was adjusted to between 7 and 8.5 by the addition of the sodium hydroxide solution. A slab of cured foam was produced from the precondensate by adding the curing catalyst/surface-active agent and n-heptane, and then heating the composition to about 80° C. in a former.

TABLE I

| | Grams | Moles | Water Content |
|---|---|---|---|
| A. Urea | 120 | 2 | |
| A. Hexamine | 25 | 0.18 | |
| A. Ethylene urea (hydrated) | 191 | 2 | 19 grams |
| A. 91% Paraformaldehyde | 185 | 5.6 formaldehyde | 17 grams |
| A. BL 35 Resin | 60 | | |
| A. Ammonium sulphamate | 7.5 | | |
| A. NaOH solution | 5 | | 3.5 grams |
| 'Arylan' SBC Acid (curing catalyst and surface-active agent) | 15 | | ... |
| n-heptane | 12.5 | | |

The water content of the precondensate arising from water present in reactants A above was 6.7% by weight. However, additional water is produced by condensation reactions. The water content determined by loss of weight on drying in vacuo over $P_2O_5$ at room temperature (20° C.) was well below the 20% by weight required according to the invention. The melamine-formaldehyde resin used in preparing the precondensate improves the film-forming characteristics of the precondensate.

The above procedure was also used to produce moulded packaging suitable for fragile articles (bottles and electronic equipment). The foamed cured material produced was homogeneous, crack-free, relatively resilient, and of relatively high compressive strength and impact resistance compared with foamed polystyrene, which is the material ordinarily used for such packaging. The material was also fire-resistant.

EXAMPLE 2

An aminoformaldehyde resin precondensate was prepared from the ingredients given below in Table II by the following procedure.

The urea, hexamine and ethylene urea were mixed and charged to a vessel suspended in a heating bath. Stirring was begun once the mixture had become sufficiently liquid to be stirred (at 50° C.). At this stage the pH of the mix was 10.

The BL35 (melamine formaldehyde) resin was added with stirring when the mixture reached 63° C.

The temperature of the heating bath was held at 65° C.-70° C. throughout the remainder of the preparation.

The paraform was added to the mixture, first dispersing and then dissolving exothermally. The ammonium sulphamate was then added (lowering the pH from 8.5 to 6) to promote the condensation reaction. The reaction was allowed to continue for 40 mins., and then aqueous 8N sodium hydroxide (3-5 ml) was added to raise the pH to 8.5. The properties of the resin syrup produced are given below in Table II.

TABLE II

| Formulation | Grams | Moles | Water Content |
|---|---|---|---|
| Urea | 180 | 3 | |
| Hexamine | 28 | 0.2 | |
| Ethylene urea (hydrated) | 96 | 1 | 10g |
| BL 35 Resin | 120 | | |
| 91% Paraform | 198 | 6 of formaldehyde | 18g |
| Ammonium sulphamate | 11.4 | | |
| 0.1 | | | |
| (Water content from reagents about 5% by weight) | | | |
| Resin Properties | | | |
| Oven solids content (by solid resin yield method, using 3 hours at 120° C.) | | 83% | |
| Free formaldehyde content | | 1% | |
| Loss of weight on drying in vacuo over $P_2O_5$ | | 15% | |
| Viscosity | | 1100 poise at 25° C. | |

A foam sample was then prepared from the resin as follows: 630 g of the resin was heated in a 2-liter beaker to 60°-65° C. and a solution of 16.3 g (0.05 mole) of dodecylbenzenesulphonic acid (curing catalyst) dissolved in 12.5 g (0.125 mole) of heptane (fraction from petroleum; blowing agent) was added with vigorous stirring over 5 minutes. The hot catalysed resin was then transferred (still in the breaker) to an oven (temperature, 115°-120° C.) where it was allowed to drain into a preheated cake mould (constructed from five square sheets of glass each of side 20 cm). The resin began to foam within 5 minutes of transfer to the oven and had cured after 30 minutes, when it was removed from the mould and allowed to cool. The above formulation provides sufficient foam to just overfill the mould.

EXAMPLE 3

A further aminoformaldehyde resin precondensate was prepared using the formulation given in Table III below by the following procedure.

The diethylene glycol, melamine and the first portion of paraform were charged to a vessel in a heating bath, and heating and stirring were begun as in Example 2. When (after 1 hour) the temperature had reached 135° C., the solids had dissolved. Heating was discontinued, and addition of the urea was begun. The urea was added slowly over a 2-hour period, during which time the temperature was allowed to fall to 110° C. and was then held at 105°-110° C.

When urea addition was complete and the urea had fully dissolved the temperature was allowed to fall to 100° C.

The second portion of paraform was then added slowly over a 2-hour period, the pH being kept above 8 by additions of 8 N aqueous sodium hydroxide as required. When the paraform addition was finished the temperature was held at 95°-100° C. for a further 20 mins. to dissolve the remaining solid paraform in the mixture. The resin was then cooled.

The total amount of 8 N NaOH added was 25 ml.

The resin was an opaque white liquid at room temperature Its properties are shown in the lower part of Table III.

TABLE III

| Formulation | Grams | Moles | Water content |
|---|---|---|---|
| Diethylene glycol | 1696 | 16 | |
| Melamine | 252 | 2 | |
| 91% Paraform (1st portion) | 132 | 4 of formaldehyde | 12g |
| Urea | 1440 | 24 | |
| 91% Paraform (2nd portion) | 1135.2 | 34.4 of formaldehyde | 103.2g |
| (Water content of reagents = 2.5% w/w) | | | |
| Resin properties | | | |
| Oven solids (by solid resin yield method, using 2 hours at 120° C.) | | 80% | |
| Free formaldehyde content | | 1% | |
| Loss of weight on drying in vacuo over $P_2O_5$ | | 13% | |
| Resin viscosity | | 400 poise at 25° C. | |

A foam sample was prepared from the resin as follows: 600 g of the resin was heated in a 2-liter beaker to 35° C. and 40.75 g (0.125 mole) of dodecylbenzenesulphonic acid dissolved in a mixture of 50 g (0.4 mole) of heptane (fraction from petroleum) and 37.6 g (0.2 mole) of trichlorotrifluoroethane was added with vigorous stirring over 5 minutes. The catalysed resin was then transferred (still in the beaker) to an oven (temperature 115°-120° C.) where it was allowed to drain into a preheated cube mould as in Example 2. The resin began to foam within 5 minutes of transfer to the oven and had cured after 60 minutes, when it was removed from the mould. The above formulation provides sufficient foam to just overfill the mould.

EXAMPLE 4

The resin preparation of Example 3 was repeated and the product was concentrated to reduce the water content and increase the viscosity and solids content.

The resin was concentrated under reduced pressure (100 mm Hg) at a temperature of 40°-65° C. until 300 g of volatile matter (mostly water) had distilled off. The properties of the resin residue are tabulated below.

| Resin properties | |
|---|---|
| Oven solids (solid resin yield Method, using 3 hours at 120° C.) | 87% |
| Free formaldehyde content | 1% |
| Loss of weight on drying in Vacuo over $P_2O_5$ | 7% |

-continued

| Resin properties | |
|---|---|
| Resin viscosity | 1300 poise at 25° C. |

A sample of foam was prepared from the resin by using the same procedure and formulation as in Example 3 except that the resin was heated to 40°–45° C. before addition of the catalyst solution.

We claim:

1. In a method of making a cured foamed aminoformaldehyde product by
   (a) dispersing a curing catalyst and a blowing agent in a liquid aminoformaldehyde precondensate to obtain a liquid foamable composition, and
   (b) heating the composition to a temperature such as to cause the flowing agent to form a foam and the aminoformaldehyde precondensate to cure,
   the improvement which consists in
   (1) employing as the aminoformaldehyde precondensate one that has a water content less than 20% by weight and a viscosity in the range of about 400 to about 1300 poise at 25° C., and is obtained from a reaction mixture which consists essentially of urea, a source of formaldehyde selected from paraformaldehyde and hexamine, and a reaction modifier to maintain the reaction mixture in the liquid phase, said modifier being selected from ethylene urea, a melamine-formaldehyde precondensate, melamine, diethylene glycol, polyvinyl alcohol, a water-soluble carbohydrate, and dicyandiamide, and
   (2) formulating the foamable composition so that, at the temperature at which foaming begins, its viscosity is in the range 100–1000 poise.

2. A method according to claim 1, in which the aminoformaldehyde precondensate is brought to a pH in the range 7–8.5 before the curing catalyst is dispersed in it.

3. A method according to claim 1 in which the viscosity of the foamable composition is in the range 100–200 poise.

4. A method according to claim 1 in which the precondensate of water content less than 20% by weight is one obtained from urea, paraformaldehyde, hexamine, and a melamine-formldehyde precondensate.

5. A method according to claim 1, in which the precondensate of water less than 20% by weight is one obtained from urea, paraformaldehyde, hexamine and ethylene urea.

* * * * *